(12) United States Patent
Harlander et al.

(10) Patent No.: US 11,800,302 B2
(45) Date of Patent: Oct. 24, 2023

(54) METHOD FOR TRANSMITTING INFORMATION RELATING TO A HEARING DEVICE TO AN EXTERNAL DEVICE, HEARING DEVICE AND EXTERNAL DEVICE FOR CARRYING OUT THE METHOD

(71) Applicant: SIVANTOS PTE. LTD., Singapore (SG)

(72) Inventors: Niklas Harlander, Nuremberg (DE); Christoph Lueken, Baiersdorf (DE); Richard Schultz-Amling, Nuremberg (DE); Christoph Kukla, Trabitz (DE)

(73) Assignee: Sivantos Pte. Ltd., Singapore (SG)

( * ) Notice: Subject to any disclaimer, the term of this patent is extended or adjusted under 35 U.S.C. 154(b) by 83 days.

(21) Appl. No.: 17/450,315

(22) Filed: Oct. 8, 2021

(65) Prior Publication Data

US 2022/0116716 A1   Apr. 14, 2022

(30) Foreign Application Priority Data

Oct. 14, 2020   (DE) ..................... 10 2020 212 964.9

(51) Int. Cl.
*H04R 25/00* (2006.01)
*H04L 67/10* (2022.01)

(52) U.S. Cl.
CPC .............. *H04R 25/55* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 2011/0176686 A1* | 7/2011 | Zaccaria | H04R 25/70 381/314 |
| 2015/0287408 A1 | 10/2015 | Svendsen et al. | |
| 2015/0339257 A1 | 11/2015 | Hug et al. | |
| 2016/0037270 A1 | 2/2016 | Polinske et al. | |
| 2020/0314568 A1* | 10/2020 | El Guindi | H04R 25/558 |

\* cited by examiner

*Primary Examiner* — Harry S Hong
(74) *Attorney, Agent, or Firm* — Laurence A. Greenberg; Werner H. Stemer; Ralph E. Locher

(57) ABSTRACT

A method for transmitting information relating to a hearing device, in particular a hearing aid, to an external device. The hearing device is thereby placed in an immediate environment of the external device and the hearing device broadcasts a generally receivable, unencrypted first information item containing metadata about the hearing device and/or access data. The unencrypted first information item is received by the external device. The external device changes its operating mode directly or indirectly as a result of the first information item and continues to be operated with the modified operating mode.

16 Claims, 5 Drawing Sheets

METHOD FOR TRANSMITTING INFORMATION RELATING TO A HEARING DEVICE TO AN EXTERNAL DEVICE, HEARING DEVICE AND EXTERNAL DEVICE FOR CARRYING OUT THE METHOD

CROSS-REFERENCE TO RELATED APPLICATION

This application claims the priority, under 35 U.S.C. § 119, of German patent application DE 10 2020 212 964.9, filed Oct. 14, 2020; the prior application is herewith incorporated by reference in its entirety.

FIELD AND BACKGROUND OF THE INVENTION

The invention relates to a method for transmitting information that relates to a hearing device to an external device, wherein the hearing device is placed in an immediate environment of the external device, wherein the hearing device broadcasts a generally receivable, unencrypted first information item containing metadata about the hearing device, and wherein the unencrypted first information item is received by the external device.

The term "hearing device" usually refers to devices that are used to output sound signals to the auditory system or, more generally, to the auditory cortex of a user of the corresponding device (also referred to as the "hearing aid wearer"). In particular, this term includes hearing aids. Hearing aids are used by people with hearing impairment to compensate for at least part of the hearing loss resulting from this hearing impairment. Usually, hearing aids comprise at least one electro-acoustic input converter for this purpose, most often in the form of a microphone, for detecting acoustic (ambient) sound and converting this into an electrical input signal. In addition, such hearing aids normally comprise a signal processing unit configured to analyze the input signal or signals for interference components (e.g., noise, background sounds and the like), to filter and/or attenuate these interference components and to amplify the remaining signal components as the useful signal (such as, in particular, speech and/or music).

To output the input signal processed in this way to the auditory system, hearing aid devices usually comprise an electro-acoustic output transducer, e.g., in the form of a loudspeaker (also referred to as a "receiver"), by means of which the processed input signal is converted into an output acoustic signal and output to the auditory system of the hearing aid wearer. Alternatively, hearing aids have a cochlear or bone-conduction receiver to provide an electrical or mechanical output signal to the auditory system.

The term "hearing device," as used herein also includes, in general and in particular in the following text, so-called tinnitus maskers, which often emit a user-specific noise signal to the auditory cortex, or other devices for sound output such as headsets ("headphones"), wireless headphones with and without active noise cancellation, so-called "hearables" and the like.

In particular, device-specific, comparatively complex algorithms for signal processing of the input signals are usually stored in signal processing units of hearing aid devices. In order to be able to adapt the respective hearing aid to an individual hearing device, these algorithms are based on variable parameters, the limits of which are specified on a wearer-specific basis when adapting the hearing aid to the hearing impairment of the hearing aid wearer.

Especially in connection with multimedia devices, such as television sets, home cinema or stereo systems, it is often advantageous to adapt the signal processing of the hearing device to each type of source accordingly. On the one hand, this can be effected by means of appropriate parameters for (in particular frequency band-specific) amplification, compression, noise cancellation, or even directional microphony. On the other hand, some multimedia devices also offer the possibility of streaming an electronic audio signal directly to the hearing aid (e.g., via Bluetooth or similar), so that the output acoustic signal is generated for the hearing aid user on the basis of the streamed signal. For a simplified operation of a hearing aid in conjunction with external devices such as multimedia devices, but also with e.g. audiological devices for analysis or fitting as used by a hearing aid specialist, it would be advantageous to transfer data relating to the hearing aid as simply as possible.

SUMMARY OF THE INVENTION

It is accordingly an object of the invention to provide a method for transmitting data which overcomes the above-mentioned disadvantages of the heretofore-known devices and methods of this general type and which provides for a method by means of which an external device can adapt its operation to a hearing device as simply as possible, in particular to a hearing aid, while guaranteeing the security of the data to be transmitted for this purpose appropriate to its sensitivity and/or authorization for use.

With the above and other objects in view there is provided, in accordance with the invention, a method for transmitting information relating to a hearing device to an external device, the method comprising:
locating the hearing device in an environment of the external device;
broadcasting by the hearing device a generally receivable, unencrypted first information item containing metadata about the hearing device and/or access data;
receiving the unencrypted first information item by the external device; and
changing an operating mode of the external device directly or indirectly as a result of the first information item and continuing an operation of the external device with a modified operating mode.

In other words, the above object is achieved according to the invention by a method for transmitting information relating to a hearing device, in particular a hearing aid, to an external device, wherein the hearing device is placed in an immediate vicinity of the external device, wherein the hearing device broadcasts a generally receivable, unencrypted first information item containing metadata about the hearing aid and/or access data, wherein the unencrypted first information item is received by the external device, and wherein the external device changes its operating mode directly or indirectly as a result of the first information item and continues to be operated with the modified operating mode. Advantageous embodiments, some of which are inventive in themselves, are the subject matter of the dependent claims and the following description.

The environment, and the "immediate vicinity," shall include in particular the same room if the external device is permanently installed in a room of a building, for example, a room of a residential building, an office space or an open-plan office, a conference room, a hotel room, a shop, etc., but also a service or treatment room of a hearing aid specialist, audiologist or doctor. The immediate environment or immediate vicinity of the external device can also be given in particular by a room in a museum, a waiting room in a train station or airport, etc. The immediate environment can be characterized in particular by the fact that the presence of the hearing device can be detected by a communication system which is part of the external device and is configured for reception via Bluetooth or WLAN, for example.

The external device in this case is an electronic device, in the operation of which any kind of audio signal processing is preferably also performed. The external device can be provided in particular by a multimedia device such as a television set, a home entertainment system or cinema system, or a stereo system, or even by a communication system for teleconferences. The external device can also be provided by a device which is used by a hearing aid specialist for an audiological analysis or for fitting the hearing device. It may also be an audio system for general broadcasting, in particular of information, but also of music, which can be used in museums, shops or railway stations and airports, for example.

In particular, the broadcasting of a generally receivable, unencrypted first information item shall be understood to mean that the hearing device provides the said first information in such a way that the first information item can preferably be received in its immediate environment by an electronic device in a standardized protocol for the unencrypted transmission of information. In particular, the hearing aid can be, for example, "visible" to other devices in its immediate vicinity, wherein the presence can be detected on the basis of the first information item so that the external device can already extract the metadata about the hearing device from the first information when detecting the presence of the hearing device. In the case of a binaural hearing device, this broadcasting of the first information item can be carried out, for example, by one of the two local units, or else both local units broadcast the first information item, preferably redundantly and on the same transmission frequency.

The reception of the unencrypted first information item by the external device should be understood here in particular to mean that the external device receives the signals used for the transmission as intended by the transmission protocol and if necessary decodes them according to the protocol, with no private key being required for the decoding, but at most freely accessible information about the protocol.

The metadata can comprise, in particular, a product name, product type, manufacturer, firmware version, and/or device type. The access data can include a reference to a storage location, e.g. in the form of a web link, or as a pointer to data stored on an internal memory of the hearing device itself.

In particular, a change in the operating mode of the external device as an immediate consequence of the initial information item shall include the case that the external device adjusts a parameter of its operation, preferably an audio signal processing parameter, in a manner specified directly in the first information item, or, based on the metadata of the first information item, detects a device type of the hearing device and sets a parameter value stored accordingly for this device type, thus changing the operating mode. In particular, in the first-mentioned case the first information item may include, for example, one or more frequency-resolved level and/or volume and/or gain curves required by the hearing device user, so that the external device outputs an acoustic signal with a corresponding level or volume characteristic via an output sound transducer, or streams an audio signal with a corresponding gain characteristic. In particular, the stream can also be sent directly and automatically from the external device to the hearing aid in response to the first information item. However, an adjustment of the operating mode can also be made in a modified, in particular enhanced, reproduction of the speech content of an audio signal. The external device can then use the first information item, if it contains appropriate information, to slightly enhance any speech content or to moderately emphasize high frequencies.

An audio signal processing parameter of the external device here shall preferably include a broadband or frequency band-specific gain factor, a compression ratio, a compression knee point, a directional microphone setting, a setting relating to a degree of reverberation suppression (in particular for a communication system as the external device), etc. Furthermore, parameters also preferably include time constants for the detection of speech and/or suppression of feedback, limit values for a noise background or for a speech component, etc. The changing of the operating mode in this case means that a specific value for the respective parameter is defined directly or indirectly as a result of the first information item, in other words, in the case of a frequency band-dependent gain factor, the parameter is a value of the gain in the respective frequency band.

In particular, the change in the operating mode may require additional confirmation by the hearing device user, i.e. that as a result of the first information item a change in the operation—e.g. a change in a parameter of the audio signal processing, or a start of the stream—is initially only proposed to the user and actually applied upon confirmation by the user.

A change in the operating mode of the external device indirectly as a result of the first information item shall include in particular the case that the first information item supplies a reference to a storage location of a possibly encrypted and/or password-protected second information item, wherein the external device, upon receipt of the first information item, carries out actions to obtain the second information item, and based on the second information item changes its operating mode, for example by adjusting an audio signal processing parameter according to a specification of the second information item, or according to a calculation performed locally using a data value of the second information item in the external device itself (or a corresponding look-up table in the external device).

The proposed procedure allows the external device to adjust its operation to the hearing device automatically based on the first information item as soon as the presence of the hearing device is detected, without the need for intervention by the hearing aid user to actively adjust the operating settings of the external device. It is also possible to define a second level of information which the external device can access when an appropriate authorization is made according to predefined access criteria, wherein the non-publicly accessible second-level information protected by the said authorization process can also be used by the external device to change the operating settings automatically.

If there is more than one hearing device wearer present in the immediate environment of the external device, with the result that the external device receives a respective first information item from more than one hearing device, it is possible in particular, on the basis of the first information, i.e. using the first information item itself or by means of further information which is accessible using the first information, to perform a hierarchization so that, for example, an audio signal processing is set such that it is still adequate for a hearing device wearer with a considerable hearing impairment without already becoming disturbing to another hearing device wearer with a less severe hearing impairment. In particular, depending on the type of adjustment to the operation of the external device, mean values or maxima and minima from the corresponding specifications for the two hearing device wearers can be used to generate an appropriate operating parameter of the external device.

Preferably, the first information item contains an indication of a first preference of the hearing device user with regard to audio signal processing and/or hearing loss support, wherein audio signal processing or hearing loss support of the external device in the modified operating mode is applied based on the preference. The external device is provided in particular by a multimedia device and/or a communication system, wherein in the intended operation of the external device an audio signal processing of an internal audio signal of the external device takes place, e.g., a signal processing and/or playback of at least one soundtrack of media content, or a signal recording and/or processing and/or playback of a speech signal. The external device can match the subsequent processing of the audio signal to the first preference of the user, which can contain, e.g., information regarding a frequency-resolved amplification or with regard to a, in particular frequency band-specific, compression (which can also include a frequency band-specific maximum output level). In particular, a potential preference for hearing loss support for a TV set as an external device may be subtitles and, if appropriate, an associated language option for the subtitles, so that the TV set can automatically display the subtitles according to the language option for subtitles specified in the first preference as a result of the first information item transferred.

Conveniently, the first information item contains a reference to a physical storage location as the access data, wherein the external device accesses a second information item stored in the physical storage location, and wherein the modified operating mode is set and/or adjusted depending on the second information item. This means in particular that the first information item refers only to the storage location, or memory location, in which the second information item is stored, wherein the actual information that the external device needs to adapt its operating mode to the hearing device is included only, or at least also, in the second information item. The reference to the physical storage location is to be understood here in particular as an indication that the reference can be used to address the storage location in which the second information item is stored, and thus the second information item can be directly accessed if the access is not restricted by an additional authorization, or that the reference can be used to request authorization for access to the second information item stored in the storage location. The storage location is physically implemented on a system that can be addressed using the reference, e.g., on a server, on the hearing device itself, or also on a smartphone (alternatively a smartwatch) which can be connected to the hearing device and is preferably configured with an app for communication with the hearing device.

Setting the modified operating mode can comprise, in particular, a computer or analysis unit of a hearing aid specialist as an external device issuing the transmission request for the adaptation of the hearing aid in order to obtain additional data for the adaptation of the hearing aid with the second information item, and on receiving this in particular user-specific audiometric data, the adaptation corresponding to the data being carried out by the hearing aid specialist by means of the computer or analysis unit. In particular, however, it is also possible to adjust the settings, in particular with regard to audio signal processing, of a multimedia device or a communication system as an external device in the same manner as described above.

Preferably, the external device addresses a transmission request with regard to the second information item to a system comprising the physical storage location, said request containing identification information of the first device and/or a transmission purpose of the second information item, wherein the second information item is transmitted to the external device, in particular in encrypted form, by the system comprising the physical storage location, depending on the identification information or the transmission purpose. This means in particular: the external device receives the reference to the storage location of the second information item, and possibly the data types contained therein, by means of the first information item. The external device then sends the transmission request to the system specified by the said reference (e.g. to the server, or to the hearing device itself) in order to request the second information item. In this case, the external device identifies itself or specifies a transmission purpose, in particular an intended use, for the requested second information item, wherein the file format of the identification or the transmission purpose can be specified in particular by means of a standardized protocol or else by additional items specified in the first information (possibly with regard to a protocol to be used). The system which comprises the physical storage location of the second information item can then decide in particular on the output of the second information item on the basis of the data transmitted with the transmission request from the external device, and the second information item can be transmitted to the external device accordingly.

It also proves to be advantageous if a, or the, user of the hearing device defines a specific identification information item or a specific transmission purpose as permissible, and the second information item is transmitted to the external device, preferably in encrypted form, by the system comprising the physical storage location if the identification information or transmission purpose in the transmission request is recognized as permissible. The said definition by the user can be made in advance and stored accordingly in the system comprising the physical storage location, or it can also be carried out ad hoc, e.g., in the form of a confirmation of the identification information or the transmission purpose in the transmission request. For confirmation by the said system, the identification information or the transmission purpose contained in the transmission request should preferably be transmitted to a smartphone (or a smartwatch, etc.) of the user, by means of which the user can perform the confirmation.

Conveniently, different identification information items or transmission purposes are defined as permissible for different versions of the second information item. This means in particular that for different device types of the external device (e.g., television set, communication system, analysis device of a hearing aid specialist) different data types can be combined in the second information item (wherein a partial overlap of the different data items is conceivable). For the different device types, different identification information items and transmission purposes are considered to be permissible, so that an external device can receive the second information item that is required for operation but no additional, possibly sensitive, data need to be transmitted.

Conveniently, the external device sends the transmission request to the hearing device as the system comprising the physical storage location. In particular, the identification information or the transmission purpose in the transmission request is defined as permissible by the user in response to the transmission request, in the sense of confirmation, e.g. by means of a smartphone (or smartwatch) connected to the hearing device via Bluetooth or similar, and an appropriately configured application installed there. However, this definition of permissibility can also be made globally in advance. Storing the second information item on the hearing device can be particularly advantageous if the second information item contains smaller amounts of data. In this case, the transmission of the second information item by the hearing device itself may provide advantages in terms of access time.

Conveniently, the identification information or the transmission purpose is defined as permissible in the transmission request by the user, and this definition is transmitted to a cloud server and stored there, wherein the external device sends the transmission request to the cloud server as the system comprising the physical storage location, wherein the second information item is transmitted by the cloud server to the external device, preferably in encrypted form, if the identification information or the transmission purpose in the transmission request is recognized as permissible on the basis of the definition stored in the cloud server. In particular, a cloud server is understood to mean any server which can be addressed via an internet connection and which is intended and configured for storing data and for executing certain pre-specified data processing operations with the stored data as well as for outputting the data that may be processed in accordance with the said operations.

In an advantageous embodiment, in the second information item data is transmitted which specifically characterizes the hearing device and/or characterizes at least one setting of the hearing device and/or contains biometric information about the user, wherein the hearing aid is specifically characterized by a product name, a product type, a manufacturer, a firmware version and/or a device type, wherein the hearing device is adjusted by means of a hearing program, a fitting, and/or a signal processing algorithm, and wherein biometric information characterizes a hearing impairment and/or a non-audiological condition and/or comprises an audiogram and/or an indication of age. Depending on the device type of the external device, data from the said categories may be particularly suitable for enabling the external device to operate in a way that is matched to the hearing aid.

In particular, the second information item, preferably in the case of authorization based on a transmission request to be checked for permissibility, can also include personal preferences of the user, which concern their diet and/or recreational behavior (e.g. sports or other activities). In this case, an external device which is arranged e.g. in a shop or a shopping center can transmit to the user appropriate information on available meal options (e.g. with regard to shopping facilities or restaurants) or leisure activities.

In the first information item, data is preferably transmitted which specifically characterizes the hearing aid and/or characterizes at least one setting of an audio signal processing, wherein the hearing aid is specifically characterized by a product name, a product type, a manufacturer, a firmware version and/or a device type, and wherein a setting of an audio signal processing is given by a frequency-resolved amplification and/or an in particular frequency-resolved compression. These data can allow a wide range of device types for the external device to operate in a way that is matched to the hearing aid without compromising the security of potentially sensitive data.

With the above and other objects in view there is also provided, in accordance with the invention, a hearing device, in particular a hearing aid, comprising a physical storage location, a first communication system and a control unit, wherein the hearing device is configured to send a first information item by means of the first communication system, to receive a transmission request from an external device by means of the first communication system, to use the control unit to check whether the transmission request contains identification information and/or a transmission purpose, and to check the permissibility of the identification information contained or the transmission purpose contained according to a definition that is or will be pre-specified, and to use the first communication system to transmit a second information item contained in the physical storage location to the external device sending the transmission request if the identification information or transmission purpose is recognized as permissible. The hearing device according to the invention shares the advantages of the method according to the invention. The advantages specified for the method and for its extensions can be transferred mutatis mutandis to the hearing device.

With the above and other objects in view there is also provided, in accordance with the invention, an electronic device which comprises a second communication system, wherein the electronic device is configured to receive an unencrypted first information item from a hearing device, in particular from a hearing aid, by means of the second communication system, to use the second communication system to send a transmission request for a second information item in response to the first information item to a system specified in accordance with the first information item, wherein the transmission request contains identification information of the first device and/or a transmission purpose of the second information item, to receive the second information item, in particular in encrypted form, from the said system by means of the second communication system, and to change the operating mode, in particular an audio signal processing, on the basis of the second information item and to continue to be operated in the operating mode thus modified, in particular with the modified audio signal processing. The electronic device according to the invention shares the advantages of the method according to the invention. The advantages specified for the method and for its extensions can be transferred mutatis mutandis to the electronic device.

Other features which are considered as characteristic for the invention are set forth in the appended claims.

Although the invention is illustrated and described herein as embodied in method for transmitting information relating to a hearing device to an external device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

Identical and equivalent parts and variables are provided with identical reference numerals throughout the figures.

DETAILED DESCRIPTION OF THE INVENTION

Figure 1:
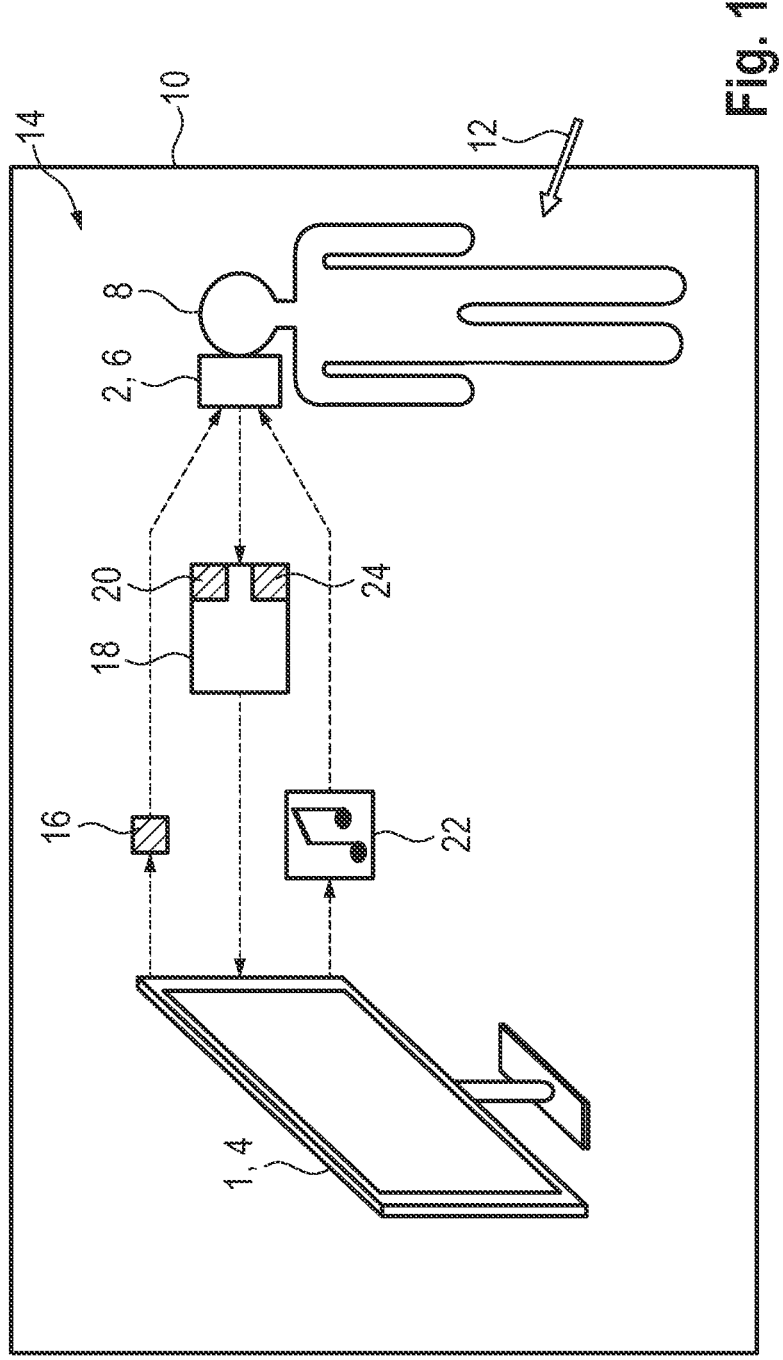
FIG. 1 is a schematic view showing a television set, the operation of which is automatically matched to a hearing device.

Referring now to the figures of the drawing in detail and first, in particular, to FIG. 1 thereof, there is shown a schematic block diagram of the operation of an external device 1 which is automatically matched to a hearing device 2. The external device 1 in the present exemplary embodiment is a television set 4, which in particular is Internet-compatible. The external device in the figure may also be another multimedia device such as a stereo system, a radio, or a home movie theater system. The hearing aid 2 in this case is designed in particular as a hearing aid 6 in the narrower sense, which is thus intended for the correction of a hearing impairment of a user 8 of the hearing device 2 and configured accordingly. The user 8 now enters a room 10 in which the television 4 is permanently arranged (the arrow 12 is intended to indicate the corresponding movement), wherein at least the room 10 is to be regarded as an immediate environment 14, i.e., the immediate vicinity, of the television set 4, since the television set 4 can communicate electronically with other devices in the room 10, for example via Bluetooth.

The hearing device 2 is now "visible" to the television set 4 in the room 10. For example, the television set 4 emits individual beacons 16 at regular intervals, wherein such a beacon 16 is received by the hearing device 2. The hearing device 2 responds to the beacon 16 by sending out an unencrypted first information item 18. The information item 18 characterizes the hearing device specifically by means of metadata 20, for example by specifying a product name, a product type, a manufacturer, possibly a firmware version, or else a device type of the hearing device 2.

By receiving the first information 18, the television set 4 can thus not only detect the presence of the hearing device 2 but as a result of the metadata 20 it can automatically adapt its operation to the hearing device 2 immediately, and thus change its operating mode. This can preferably be carried out by broadcasting a streaming signal 22 to the hearing device 2, in which the audio tracks of the media content being played back by the television set are encoded (for example, right and left track), so that in the hearing device 2, a sound signal is generated for the user 8 on the basis of the streaming signal 22, while in particular a microphone signal of the hearing device 2 can be attenuated or completely switched off. In particular, before starting to broadcast the streaming signal 22, the television set 4 may first suggest the said broadcasting to the user 8 for confirmation, possibly also for confirmation by a voice command.

The first information item 18 can include a first preference 24 of the user 8 with regard to audio signal processing, which may be provided in particular by frequency band-specific amplification and/or in particular frequency band-specific compression (characterizable using the respective nodal point and/or the compression ratio and, if appropriate, using the time constants). On receiving the first preference 24, the television set 4 can adjust its audio signal processing according to the first preference 24. On the one hand, this can be effected by a corresponding pre-processing of the streaming signal 22 according to the first preference 24, i.e. by raising or lowering certain frequency bands or also by compression or complete clipping of particularly loud signal components, or preferably also by outputting an acoustic signal via the loudspeakers (not shown) of the television set 4, modified in accordance with the first preference 24. This can be particularly advantageous if the user 8 does not want to transmit the streaming signal 22. In an embodiment not illustrated in detail, the adaptation of the operation of the television set 4 to the detected presence of the hearing device 2 may also include, for example, displaying a subtitle—if appropriate, using a language defined by the first information item 18—wherein the display is suggested to the user 8 for confirmation. The automatic adaptation described here and on the basis of the other exemplary embodiments of the operation of the external device 1, i.e. in the present case the television set 4, to the hearing device 4 detected as present, based on specifications which are contained in the first information item 18 or can be extracted from the first information item 18, is particularly advantageous if the user 8 cannot always immediately be guaranteed direct access to the control of the external device 1.

Figure 2:
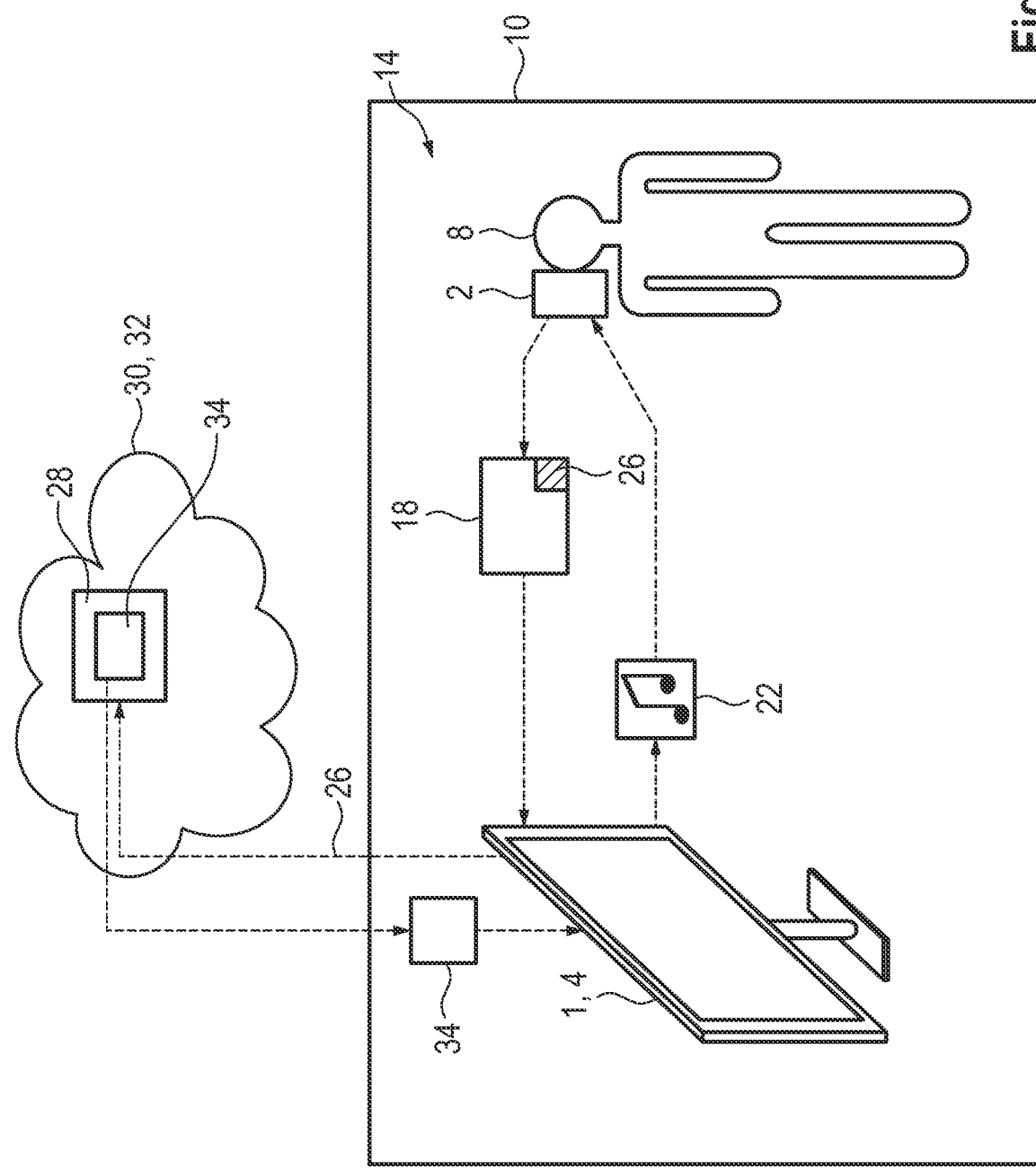
FIG. 2 shows the television set according to FIG. 1, which adapts its operation to the hearing device by means of information from a cloud server.

FIG. 2 shows a schematic block diagram of another way in which the television set 4 according to FIG. 1 can automatically adapt its operation to the hearing device 2 according to FIG. 2 in accordance with the specifications of the user 8. The first information item 18 broadcast by the hearing device 2 to the television set 4 (the beacon 16 is not shown in FIG. 2) contains a reference 26 to a storage location 28 in a cloud server 30. In particular, the cloud server 30 is to be regarded as a system 32 in which the storage location 28 is physically implemented. For example, the reference 26 can be implemented as a corresponding link via which the physical storage location 28 in the cloud server 30 can be addressed. A second information item 34, to which the television set 4 can obtain access by means of a corresponding request via the reference 26, is stored in the storage location 28.

In the exemplary embodiment according to FIG. 2, the second information item 34 is accessible, in particular unencrypted, for any request solely on the basis of the link given by the reference 26. Since the reference 26 is output unencrypted in the first information item 18 by the hearing aid 2, the second information item 34 in the exemplary embodiment according to FIG. 2 is thus also unencrypted and, in particular, accessible without additional authorization. As a result, the second information item 34 according to FIG. 2 preferably contains the metadata 20 and/or the first preference 24 contains audio signal processing according to FIG. 1. The change in the operating mode of the television set 4 to reception of the second information item 34 can now be made in a similar way as to the exemplary embodiment shown in FIG. 1, for example by automatically applying the frequency band-specific amplification given by the first preference 24.

Figure 3:
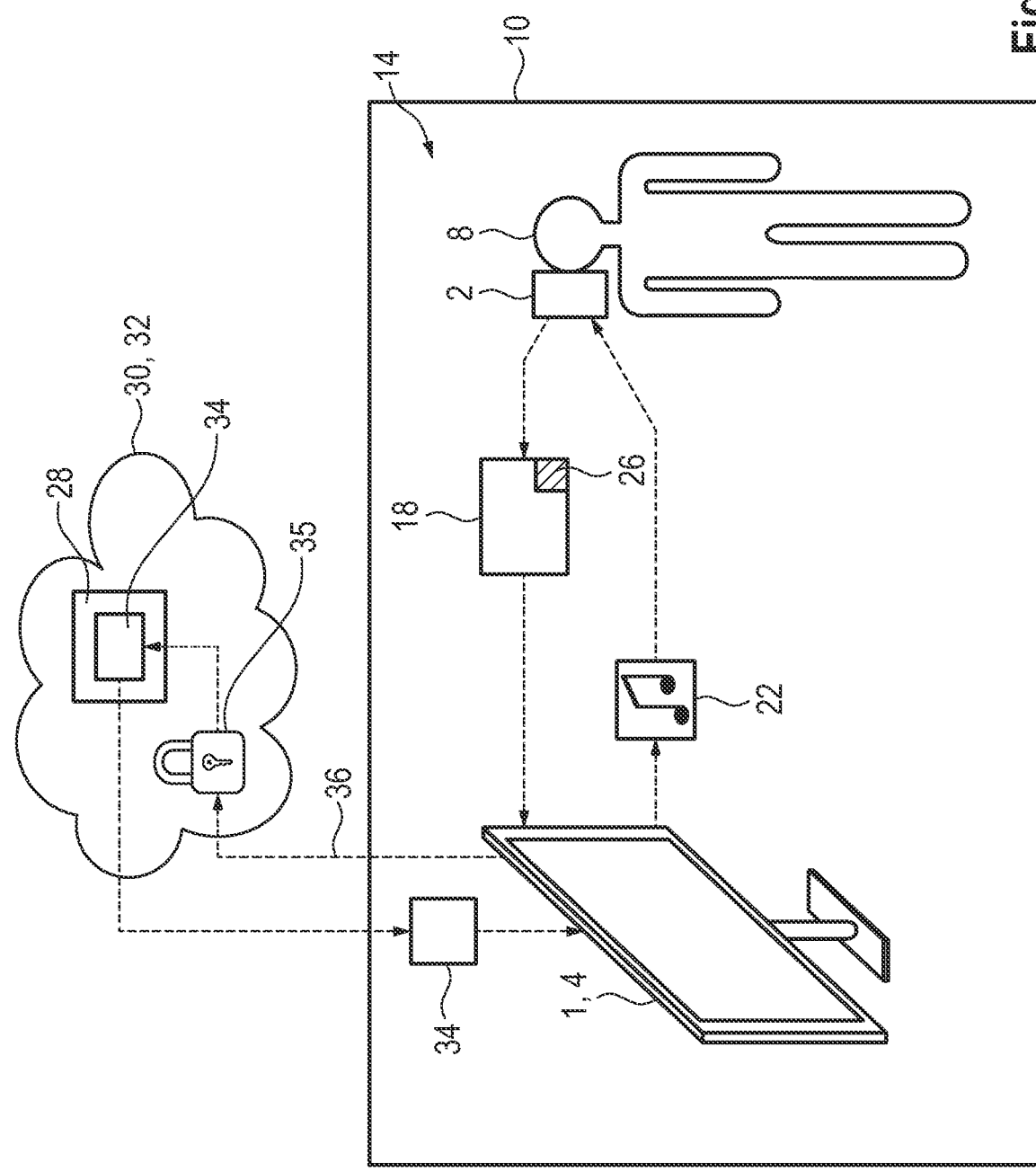
FIG. 3 shows a variant of the television set according to FIG. 2, wherein an authorization is carried out by the cloud server.

FIG. 3 shows a schematic block diagram of an extension of the automatic adaptation of the operation of the television set 4 to the hearing device 2, as shown in FIG. 2. As in the exemplary embodiment according to FIG. 2, the hearing device 2 sends a first information item 18 to the television set 4, containing a reference 26 to a storage location 28 in the cloud server 30 (again, the beacon 16 is not shown). In contrast to FIG. 2, however, the second information item 34 stored on the storage location 28 of the cloud server 30 is no longer generally accessible, but protected by a specific authorization 35, which is indicated symbolically here. To gain access to the second information item 34, the television set 4 sends a transmission request 36 to the cloud server 30 after receiving the first information item 18 containing the reference 26. The transmission request 36 here can be made in a standardized file format, which can be specified by additional information from the first information item 18 for the television set 4. The transmission request 36 can comprise in particular identification information for the television set 4 (for example, make and/or type of the requesting external device 1, manufacturer, product name/model, etc.). The transmission request 36 can also include an intended transmission purpose for the requested second information item 34, thus in particular an intended use of the received second information item 34 by the external device 1, which may be indicated according to standardized file types.

The user 8 of the hearing device 2 has made specific definitions for the second information item 34 in advance for the physical storage 28 of the cloud server 30 assigned to him/her, in which the second information 34 relating to his/her hearing device 2 is stored, for example via a corresponding web app (operable via a smartphone or similar), as to which identification information and/or which transmission purpose of the transmission request 36 are to be regarded as permissible. Therefore, if the identification information or the transmission purpose in the transmission request 36, which the television set 4 provides to the cloud server 30 for the purpose of issuing the second information item 34, is permissible within the definition specified by the user 8, the corresponding second information item 34 is output to the television set 4. In a manner already described the television set 4 can use the second information item 34 to adapt its operation to the hearing device 2. If the identification information or the transmission purpose of the television set 4 is not deemed to be permissible by the cloud server 30 (because the corresponding transmission request 36 does not include the definitions previously specified by the user 8) then the second information item 34 is not output.

Figure 4:
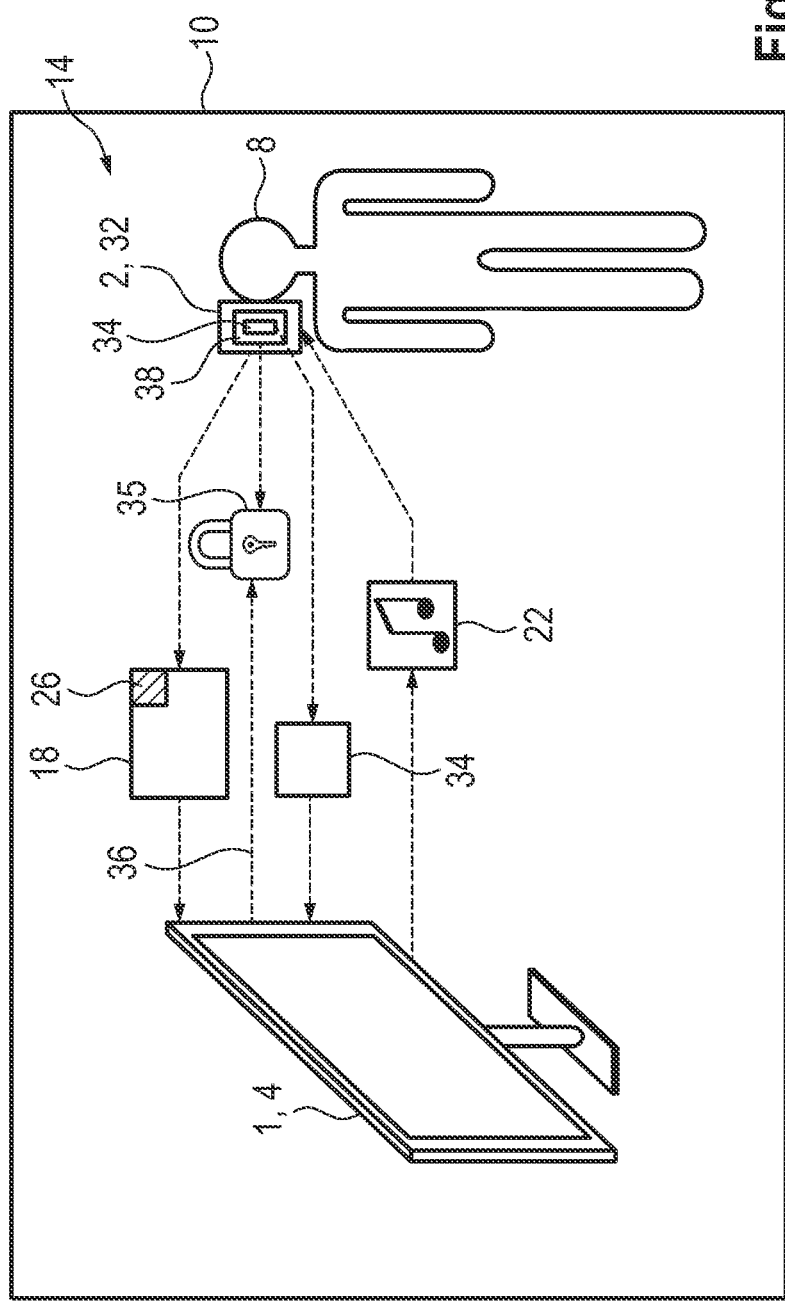
FIG. 4 shows a television set, the operation of which is automatically adapted to a hearing device by means of access-protected information stored in the hearing aid.

FIG. 4 shows a schematic block diagram of an alternative to the automatic adaptation of the operation of the television set 4 to the hearing device 2 as shown in FIG. 3. As in the exemplary embodiment according to FIG. 3, the hearing aid 2 sends a first information item 18 to the television set 4 when the hearing device 2 reaches the room 10 and thus also the immediate environment 14 of the television set 4. However, the reference 26 contained in the first information item 18 does not refer to a storage location 28 in a cloud server 30, but to an allocated physical memory location 38 in a memory of the hearing device 2. In this case therefore, the hearing device 2 forms the system 32 comprising the physical storage location 38. This storage location 38 of the hearing device 2, in a comparable way to the storage location 28 on the cloud server 30, is also protected by a mechanism for authorization 35 (illustrated symbolically). The authorization 35 is again carried out on the basis of the transmission request 36 broadcast by the television set 4 to the hearing device 2 (which the television set 4 emits upon detection of the hearing device 2 and on the basis of the first information item 18 received from the same). The transmission request 36 can contain, as in the exemplary embodiment according to FIG. 3, identification information of the television set 4 and/or an intended transmission purpose for the requested second information item 34.

The definition of which identification information and/or which transmission purpose of the transmission request 36 are to be regarded as permissible is preferably specified in advance by the user 8. As an alternative, or in the case of a transmission request 36 initially classified as impermissible with regard to the pre-specified definition, the user 8 can also define identification information or a transmission purpose of a transmission request 36 as permissible in an ad hoc manner by appropriate confirmation (e.g. by using a designated application on a smartphone connected to the hearing device 2). In a manner already described the television set 4 can use the second information item 34 to adapt its operation to the hearing device 2.

Figure 5:
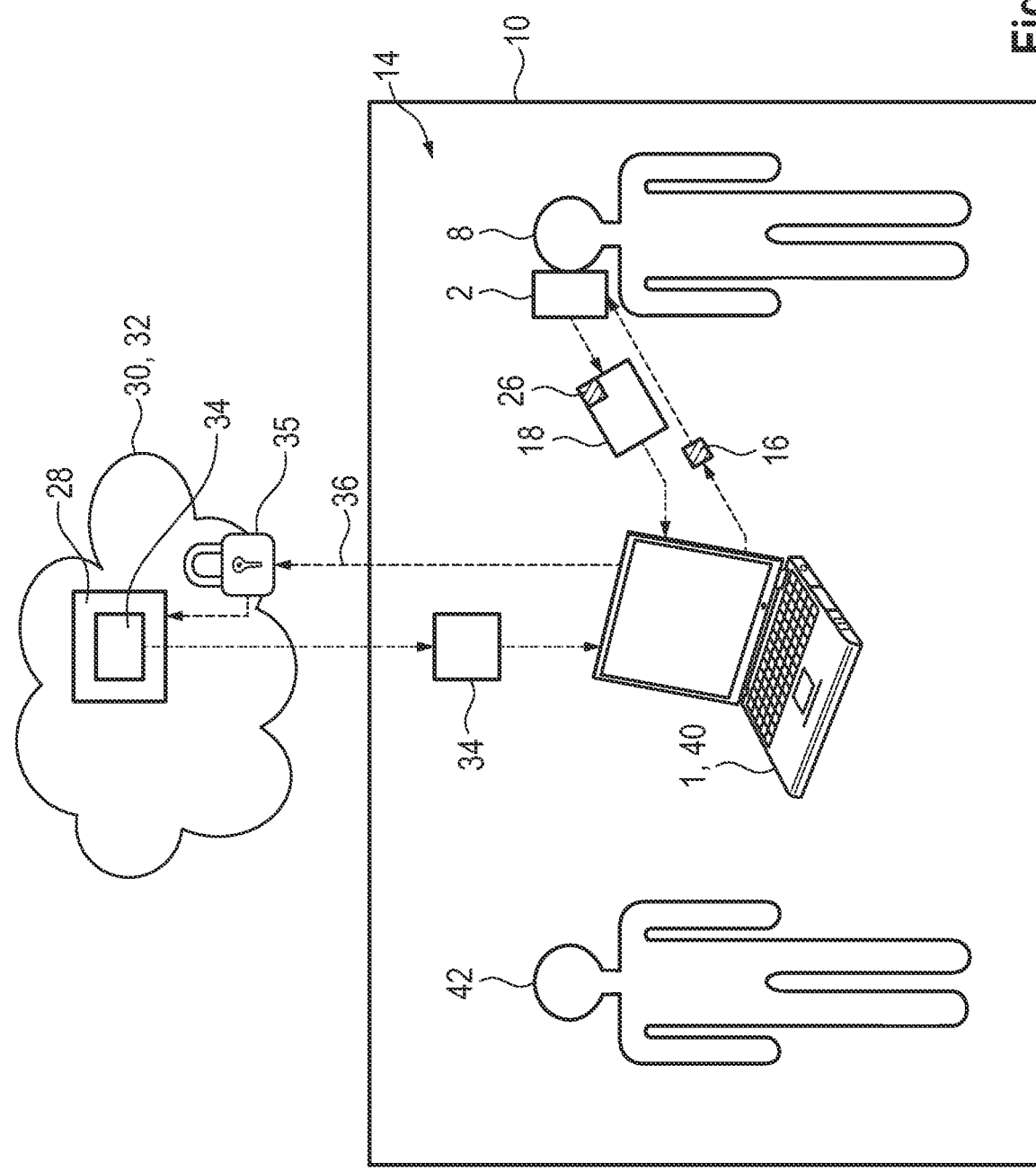
FIG. 5 schematic view showing a computer of a hearing aid specialist, which can automatically request information about the hearing device and/or its user for adapting a hearing device.

FIG. 5 shows in a schematic block diagram how an external device 1, which in this case is provided by a computer 40 of a hearing aid specialist 42, automatically matches its operation to a hearing device 2. The computer 40 here is to be considered in particular generically as the totality of the analysis instruments available to the hearing aid specialist 42 for adapting the hearing aid 2. The procedure for transmitting the information is substantially similar to the exemplary embodiment shown in FIG. 3. However, another form of transmission would also be conceivable for the automatic matching of the computer 40 of the hearing aid specialist 42 shown here, in particular the transmission of the second information item 34 by the hearing device 2 itself, as shown in FIG. 4.

The computer 40 emits a beacon 16 to which the hearing device 2 responds if the user 8 is located in the room 10 and thus also in the immediate environment 14 of the computer 40, with the transmission of the unencrypted first information item 18, which contains the reference 26 to the physical storage 28 in the cloud server 30. On receipt of the first information item 18, the computer 40 sends a transmission request 36 to the cloud server 30, in which identification information is received to the effect that the transmission request 36 was issued by a hearing aid specialist 42, as well as a transmission purpose of the second information item 34 requested by the computer 40 and to be transmitted thereto, to the effect that the second information item 34 is intended for use in an adaptation of the hearing device 2 by the hearing aid specialist 42.

On the basis of the definitions previously specified by the user 8 of the hearing device 2 as to which identification information or which transmission purpose specified in the transmission request 36 is to be regarded as permissible, the cloud server 30 performs an authorization 35 so that the second information item 34 is sent to the computer 40. The second information item 34 in this case can comprise in particular audiometric data (e.g. an audiogram of the user 8), but also biometric data, such as the age of the user 8 or other medical data relevant to the adaptation of the hearing device 2. Upon receipt of the second information item 34 with the said data, the computer 40 can carry out the adaptation on the basis of the received audiometric and possibly other data, thus causing, so to speak, the operating mode of the computer 40 to undergo a change as a result of the second information item 34 (namely tailoring the adaptation process individually to the user 8).

The second information item 34 symbolically represented in FIG. 3 and FIG. 5 comprises different data types in each case, since in the exemplary embodiment according to FIG. 3 the television 4 matches its operation to the hearing device 2, and in the exemplary embodiment according to FIG. 5 an adaptation is to be made by the hearing aid specialist 42, for which different information is generally required. Accordingly, the definition of the permissibility of the data transmitted in the respective transmission request 36 (identification information and/or transmission purpose) may take different forms in the two cases.

Although the invention has been illustrated and described in detail using the preferred exemplary embodiment, the invention is not limited by this exemplary embodiment. Other variations can be derived from this by the person skilled in the art without departing from the scope of protection of the invention.

The following is a summary list of reference numerals and the corresponding structure used in the above description of the invention:

1 external device
2 hearing device
4 television set
6 hearing aid
8 user
10 room
12 double arrow
14 immediate environment
16 beacon
18 first information item
20 metadata
22 streaming signal
24 first preference
26 reference
28 storage location
30 cloud server
32 system
34 second information item
35 authorization
36 transfer request
38 storage location
40 computer
42 hearing aid specialist

The invention claimed is:

1. A method for transmitting information relating to a hearing device to an external device, the method comprising:
locating the hearing device in an environment of the external device;
broadcasting by the hearing device a generally receivable, unencrypted first information item containing metadata about the hearing device and/or access data, the access data being a reference to a physical storage location;
receiving the unencrypted first information item by the external device; and changing an operating mode of the external device directly or indirectly as a result of the first information item and continuing an operation of the external device with a modified operating mode;
accessing with the external device a second information item stored in the physical storage location; and
setting and/or adjusting the modified operating mode in dependence on the second information item.

2. The method according to claim 1, wherein the environment of the external device is an immediate vicinity of the external device.

3. The method according to claim 1, wherein:
the first information item contains an indication of a first preference of a user of the hearing device with regard to an audio signal processing and/or hearing loss support; and
an audio signal processing or hearing loss support of the external device is carried out in the modified operating mode based on the first preference.

4. The method according to claim 1, further comprising:
addressing with the external device a transmission request with regard to the second information item to a system that contains the physical storage location, the request containing identification information of the first device and/or a transmission purpose for the second information item; and
transmitting the second information item from the system that contains the physical storage location to the external device in dependence on the identification information or the transmission purpose.

5. The method according to claim 4, which comprises:
defining by a user of the hearing device a specific identification information item or a specific transmission purpose as permissible; and
when the identification information and/or the transmission purpose in the transmission request is recognized as being permissible, transmitting the second information item to the external device by the system that contains the physical storage location.

6. The method according to claim 4, wherein different identification information items or transmission purposes are defined as permissible for different versions of the second information item.

7. The method according to claim 5, wherein the hearing device is the system that contains the physical storage location and the external device sends the transmission request to the hearing device.

8. The method according to claim 7, which comprises defining by the user the identification information or the transmission purpose in the transmission request as being permissible in response to the transmission request.

9. The method according to claim 5, which comprises:
defining by the user the identification information or the transmission purpose in the transmission request as permissible, and transmitting the definition to a cloud server for storage in the cloud server; and
sending the transmission request from the external device to the cloud server as the system that contains the physical storage location; and
transmitting the second information item to the external device by the cloud server if the identification information and/or the transmission purpose in the transmission request is recognized as being permissible based on the definition stored in the cloud server.

10. The method according to claim 1, which comprises:
transmitting the second information item with data that specifically characterizes the hearing device and/or characterizes at least one setting of the hearing device and/or contains biometric information about the user;
wherein the hearing device is specifically characterized by a product name, a product type, a manufacturer, a firmware version, and/or a device type;
wherein the hearing device is adjusted by way of a hearing program, a fitting, and/or a signal processing algorithm; and
wherein biometric information characterizes one or more of a hearing impairment or a non-audiological condition, and comprises one or more of an audiogram or an indication of age.

11. The method according to claim 1, wherein:
data is transmitted in the first information item that specifically characterize the hearing device and/or that characterize at least one first preference of an audio signal processing;

the hearing device is specifically characterized by one or more of a product name, a product type, a manufacturer, a firmware version, or a device type; and a first preference of an audio signal processing is given by a frequency-resolved gain or a frequency-resolved compression.

12. The method according to claim 1, configured for a hearing aid being the hearing device.

13. A hearing device, comprising:

a physical storage location, a communication system, and a control unit, the control unit being configured:

to send a first information item by way of the communication system;

to receive a transmission request from an external device by way of the communication system;

to use the control unit to check whether the transmission request contains identification information and/or a transmission purpose, and to check a permissibility of the identification information or the transmission purpose according to a given definition; and if the identification information or the transmission purpose is recognized as being permissible, to use the communication system to transmit a second information item contained in the physical storage location to the external device from which the transmission request has been received.

14. The hearing device according to claim 13, wherein said given definition is predetermined or is specified at hoc.

15. The hearing device according to claim 13, configured as a hearing aid.

16. A method for transmitting information relating to a hearing device to an external device, the method comprising:

locating the hearing device in an environment of the external device;

broadcasting by the hearing device a generally receivable, unencrypted first information item containing metadata about the hearing device and/or access data;

receiving the unencrypted first information item by the external device; and changing an operating mode of the external device directly or indirectly as a result of the first information item and continuing an operation of the external device with a modified operating mode; and wherein data is transmitted in the first information item that specifically characterize the hearing device and/or that characterize at least one first preference of an audio signal processing;

the hearing device is specifically characterized by one or more of a product name, a product type, a manufacturer, a firmware version, or a device type; and a first preference of an audio signal processing is given by a frequency-resolved gain or a frequency-resolved compression.

* * * * *